Oct. 14, 1952     A. ULMANIEC     2,613,976
BUMPER STRUCTURE
Filed Aug. 20, 1945
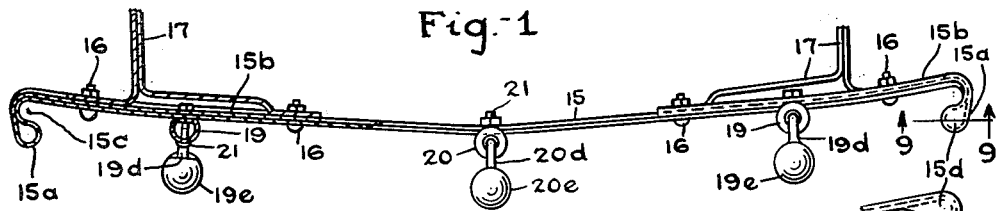
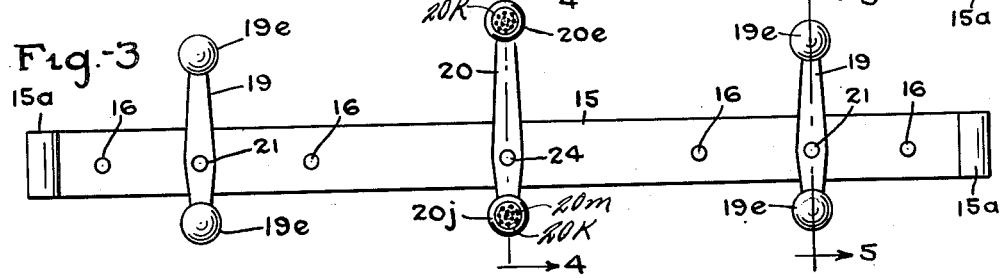
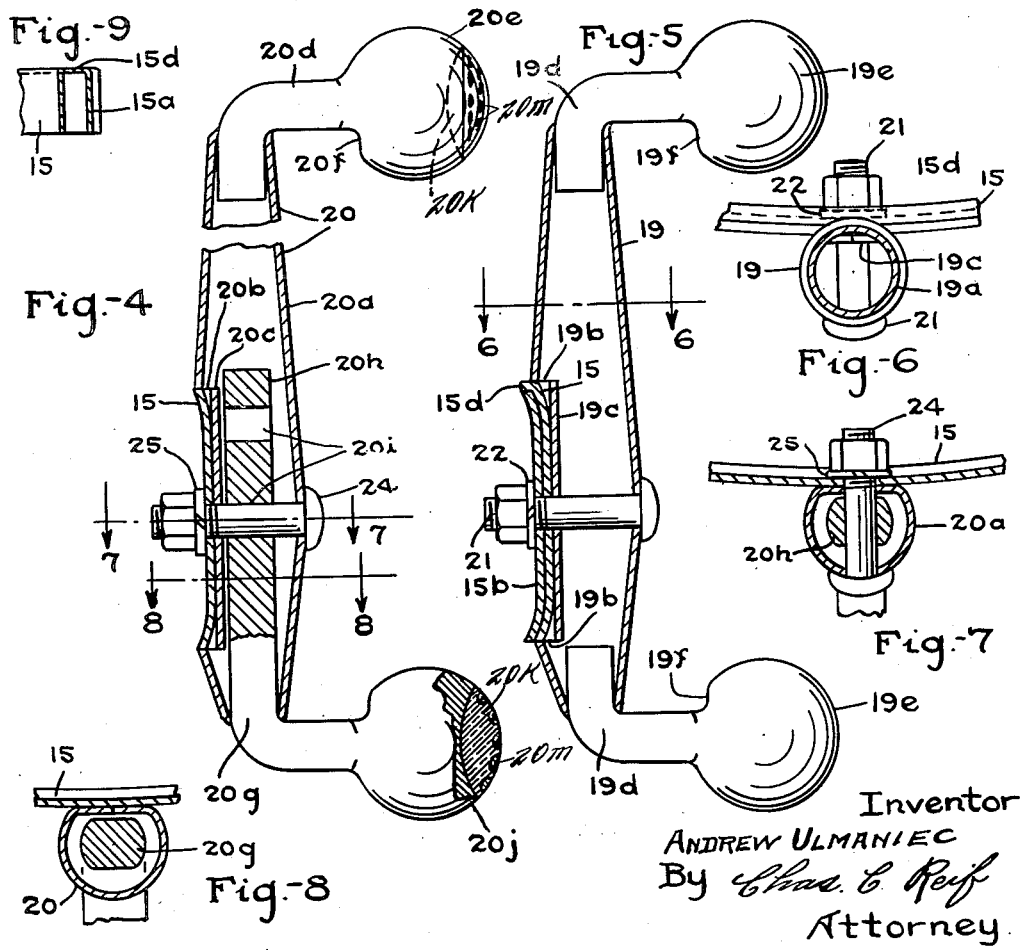
Inventor
ANDREW ULMANIEC
By Chas. E. Reif
Attorney Patented Oct. 14, 1952

2,613,976

UNITED STATES PATENT OFFICE 2,613,976

BUMPER STRUCTURE

Andrew Ulmaniec, Minneapolis, Minn.

Application August 20, 1945, Serial No. 611,483

14 Claims. (Cl. 293—67)

This invention relates to a bumper structure for an automotive vehicle.

It is an object of this invention to provide a simple and improved form of automobile bumper.

It is a further object of the invention to provide a bumper structure in which the terminal portions of the bumper are bent rearwardly and inwardly in a curve and preferably formed as a loop.

It is another object of the invention to provide a bumper structure as set forth in the preceding paragraph in which said loop is spaced from the outer side of the bumper and in which there is a plate or other means closing or covering the top of the loop and also preferably the space between the loop and the bumper.

Another object of the invention is to provide a bumper structure with members or guards secured thereto and extending vertically at the outer side of the bumper, said members having other members secured therein and having portions extending outwardly away from the bumper at the ends of said members, said portions having terminal enlargements preferably of substantially spherical form.

It is more specifically an object of the invention to provide a bumper with one or more members secured thereto and extending vertically at the outer side thereof, said members being of tubular form and preferably tapering toward their ends together with other members received in the ends of said tubular members and having portions extending substantially horizontally outwardly away from the bumper, said portions being provided with substantially spherical enlargements at their outer ends.

It is still further an object of the invention to provide such a structure as set forth in the preceding paragraph in which one or more of said other members may be held in different positions longitudinally of said first mentioned members.

These and other objects and advantages of the invention will be fully set forth in the following description made in connection with the accompanying drawings in which like reference characters refer to similar parts throughout the several views and in which:

Fig. 1 is a plan view of a bumper embodying the present invention;

Fig. 2 is a partial view similar to Fig. 1 of one end of the bumper showing a modification;

Fig. 3 is a view in rear elevation of the bumper structure;

Fig. 4 is a vertical section taken on line 4—4 of Fig. 3, as indicated by the arrows;

Fig. 5 is a vertical section taken on line 5—5 of Fig. 3, as indicated by the arrows;

Fig. 6 is a horizontal section taken on line 6—6 of Fig. 5, as indicated by the arrows;

Fig. 7 is a horizontal section taken on line 7—7 of Fig. 4, as indicated by the arrows;

Fig. 8 is a horizontal section taken on line 8—8 of Fig. 4, as indicated by the arrows; and Fig. 9 is a vertical section taken on line 9—9 of Fig. 1; as indicated by the arrows.

Referring to the drawings, a bumper 15 is shown such as now commonly used on automobiles, and while this bumper could be varied in form, in the embodiment of the invention illustrated it is shown as made from a flat bar having much greater width than thickness and being disposed substantially in a vertical plane. At its end portions, member 15 is bent rearwardly or away from the body of said vehicle and inwardly, as shown in Fig. 1, and in the embodiment of the invention illustrated, said member is bent upon itself to form a rearwardly and inwardly directed loop portion 15a. Said loop portion is directed away from the body of said vehicle. Member 15 thus has a portion 15b extending in the rear of its main portion and in contact therewith. Said member 15 is secured to the frame of the vehicle by the headed and nutted bolts 16 which extend through the respective arms of a bracket 17 extending from the frame of the automotive vehicle. The loop 15a forms a loop-shaped space 15c between the same and the adjacent part of the bumper. The upper portion of the loop 15a is preferably closed or covered by a plate or similar means 15d extending across the top thereof which will be flush with the top of member 15. Said portion 15d may also extend across the top of the space 15c, as shown in Fig. 2.

Member 15 is also provided with and has secured thereto members or guards 19 and 20. The member 20 is disposed substantially centrally of the member 15, while members 19 which are similar are disposed at equal distances from member 20 and adjacent the ends of the bumper. Members 19 comprise a tubular portion or body 19a which is preferably tapered toward its ends. Said portion 19a has cuts or slits 19b formed therein and extending transversely thereof at its rear side and a portion 19c between said slits is pressed inwardly some distance toward the longitudinal center of member 19. The member 19 is placed against the outer side of bumper or bar 15 and the bottom and top edges of said member at the slits 19b engage respectively with the top and bottom edges of the bar 15, as shown in Fig. 5. Portion 19c can thus be made to engage the front surface of member 15 throughout the desired extent. Member 19 is secured to the bar 15 by a headed and nutted bolt 21, the same preferably being equipped with a lock washer 22 under the nut thereon. Disposed at each end of portion 19a is another portion 19d and this has its end extending into the end of portion 19a in telescoped relation. Portion 19d will be secured to portion 19a in any suitable manner as by welding. Said portion 19d extends outwardly substantially horizontally away from bar 15 and away from the body of the vehicle or automobile at the end of portion 19a for some distance and is equipped with a terminal enlargement 19e which is preferably of substantially spherical form. One inner side portion of the part 19e, which is the portion adjacent portion 19a, is somewhat flattened, as shown at 19f.

The member 20 has a tubular portion 20a which is similar in all respects to portion 19a except that it projects a somewhat longer distance above the bar 15. Member 20a has a portion 20d therein similar to portion 19d already described, and this will be secured to portion 20a in any suitable manner, as by welding. Portion 20d has a terminal enlargement 20e with an inner flattened portion 20f corresponding to parts 19e and 19f. Member 20 is also provided with spaced slits or cuts 20b, similar to the cuts 19b, and with an inwardly pressed or offset portion 20c similar to portion 19c. A portion 20g is provided having one end part 20h thereof received in the lower end of portion 20a, said part 20h being provided with spaced holes 20i. Portion 20g extends horizontally some distance at the bottom of portion 20a and is provided with a terminal enlargement 20j similar to enlargement 20e. The part 20h may be somewhat flattened at its front and rear sides, as shown in Fig. 7. Member 20 is secured to bar 15 by a headed and nutted bolt 24, which is preferably provided with a lock nut 25 under the nut thereon. It will be seen that bolt 24 passes through one of the holes 20i. In Fig. 4 bolt 24 is shown as passing through the lower of holes 20i but it will be seen member 20g can be lowered so as to project further out of member 20a at the lower end of the latter, and bolt 24 can then pass through the upper aperture 20i. The portions 19e and 20e may be provided with reflectors 20k, as shown in Fig. 4. These will comprise segmental inserts, preferably of metal, set into the outer sides of portions 20e symmetrical of a horizontal diameter thereof. Portions 20k will preferably be provided with a plurality of small bodies or reflectors 20m, such as prisms or semi-spherical bodies of glass or similar material which may have a reflective coating on their undersides. Portions 20m will preferably be of some distinctive color, such as red. This gives the reflective effect of quite a large number of reflective dots or areas. Such a reflective effect is now commonly used on stop signs for streets and highways.

The structure of bumper above described will have great utility in operation. It happens more or less frequently that the right-hand end of the front bumper will become positioned in front of the left-hand end of a rear bumper and thus be somewhat locked in position. Such incidents usually occur when a driver is manipulating the car into a parking space or when he is leaving a parking space. On parking lots the cars are often parked close together and the bumpers sometimes become engaged, as above described. It is also more or less common for fenders to be bent or nicked in maneuvering the car in parking and in parking lots. With the structure of the present bumper at the ends, it will be seen that if the end of a front bumper would engage the rear of the loop 15a, the bumper would be prevented from moving past or getting in front of the bumper 15. The outer curved side of the loop would tend to deflect the bumper and cause the car to move in a line where it would not only avoid locking of the bumpers but in which it would also miss the fender of the car having the bumper 15 thereon. It would thus be practically impossible for the end of another bumper to be locked with or positioned in front of the end of the bumper 15. The projecting loop 15a, which extends away from the body of the vehicle or automobile, also forms a guard and protection for the main body of the bumper. There will be some resiliency to the bar 15 and loop 15a so that it can absorb quite a shock without damage. The bumper 15 is illustrated as forming a rear bumper but it is also obvious that it could be used for a front bumper as well. As a front bumper it would act to avoid being locked with another rear bumper. Even if the extreme outer end portion of the bumper would get in front of a rear bumper it would only be necessary to back the car and the curved surface of the outer loop 15a would enable the bumpers to readily separate. When acting as a front bumper, the loop 15a would form excellent protection and the curved surface thereof would not act to cut or seriously damage a fender with which it might come into contact.

The members 19 and 20 have a pleasing appearance and act effectively as guards. It is a more or less frequent happening that when one car parks behind another on the upper side thereof on a grade or hill that a part of the front bumper on the rear car will slide over the rear bumper on the car ahead and drop back of the same. This usually makes a difficult job to get the cars separated. It will be seen that with the present construction there is a recess formed between the outer side of portions 19a and 20a and the enlargements 19e and 20e respectively. The horizontal part of portions 19d and 20d would thus prevent the bumper on another car from sliding over the bumper bar 15. Likewise if the bumper were on the front, said horizontal portions would prevent bumper 15 from sliding over another bumper. The projecting upper and lower parts on members 19 and 20 protect the central part of said members. The curved surfaces of the enlargements 19e and 20e as well as the curved outer surfaces of the portions 19a and 20a have a deflecting effect on any object that contacts the same. A portion of another car such as a fender or bumper guard would be deflected laterally so that it would be brought against the bar 15 and reduce the strain on the members 19 and 20. The spherical portions 19e and 20e also tend to do less damage if brought in contact with another car. The tendency of the bumper to cut or tear the metal of another car is greatly reduced by the spherical portions 19e and 20e.

In most cases the portion 20g would be positioned with the bolt 24 in the upper of the apertures 20i so that the central member 20 would extend further below bar 15 than the side members 19. However, if the driver has to drive on a steep ramp or over places where the bottom of the enlargement 20j would be apt to strike the pavement, the portion 20g can be positioned, as shown in Fig. 4.

From the above description it will be seen that I have provided a bumper structure which is not only pleasing in appearance but which also attains many advantages. Some of these advantages have been above described. As stated, the curved surfaces on portions 19d, 20d and 20g, as well as the curved surfaces on the terminal enlargements thereof, tend to prevent damage. In working about the car and in washing the same these curved surfaces prevent any damage to the operator's hands. There are no sharp corners or edges of the members 19 and 20. It will be apparent that the device has a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A bumper structure for an automotive vehicle having a body comprising a horizontally extending comparatively flat bar with its flat side disposed substantially in a vertical plane, a member secured to said bar and extending above and below the same, said member being of tubular form, a second member extending into the end of said member and secured therein, said second member being bent to extend substantially horizontally away from said bar at the said end of said first mentioned member in a direction away from the adjacent end of said body and having an enlarged and rounded portion at its end.

2. A bumper structure for an automotive vehicle comprising a comparatively flat bar with its flat side extending substantially vertically, a member secured to said bar and extending above and below the same, said member being of tubular form and tapering toward its ends, a second member extending into the end of said first mentioned member and having a horizontally extending portion at the end of said first mentioned member, said horizontal portion having an enlarged substantially spherical portion at its end.

3. The structure set forth in claim 2, said spherical portion being flattened at its inner side and at the part thereof adjacent said first mentioned member.

4. A bumper structure for an automotive vehicle comprising a horizontally extending comparatively flat bar with its flat side disposed substantially in a vertical plane, a member secured to said bar and extending above and below the same, said member being of tubular form and of general circular shape in horizontal cross section, said member having spaced horizontal slits formed at one side and having an offset portion between said slits engaging said bar so that the remote edges of said slits engage the top and bottom of said bar respectively, and means passing through said member and bar between said slits for securing said member to said bar.

5. A bumper structure for an automotive vehicle having in combination, a bar adapted to extend substantially horizontally transversely of said vehicle, a member of tubular form extending transversely of said member and having an open lower end, a second member having a portion extending into said member through said end and having a plurality of vertically spaced holes therein securing means adapted to pass through one of said holes and said bar, said second member having a portion extending horizontally away from said bar adjacent said end of said first mentioned member, said portion having a rounded terminal enlargement.

6. A bumper structure for an automotive vehicle having in combination, a bar adapted to extend substantially horizontally transversely of said vehicle, a member of tubular form extending transversely of said member and having an open lower end, a second member having a portion extending into said member through said end, and a portion extending horizontally away from said bar adjacent said end, said latter portion having a rounded enlarged end, and means for holding said second member in different positions in said first mentioned member.

7. A bumper structure for an automotive vehicle comprising a comparatively flat bar with its flat side extending substantially vertically, a member secured to said bar and extending above and below the same, said member being substantially circular in horizontal cross section and tapering toward its ends, the same having portions adjacent its ends extending horizontally away from said bar and provided with terminal enlargements having outer rounded surfaces respectively, said enlargements extending above and below said portions.

8. A bumper structure for an automotive vehicle having in combination with a transversely extending substantially horizontal bumper, a member extending at right angles to said bumper having portions at its upper and lower ends extending substantially horizontally in a direction away from the body of said vehicle and each of said portions having a substantially semispherical end portion directed away from the body of said vehicle, said last mentioned portion having a surface extending substantially vertically at its side adjacent said bumper forming a slight shoulder at the side thereof adjacent said bumper.

9. A bumper structure for an automotive vehicle comprising a body having in combination, a bumper formed of a substantially rigid bar of much greater width than thickness and disposed substantially in a vertical plane, said bumper having at its ends a closed terminal loop having an outer convex surface and formed of said bar and of substantially the width of said bar, said loop and bar forming an open hook at the end of said bumper directed away from the body of said vehicle and somewhat inwardly toward the center of said bumper.

10. The structure set forth in claim 9, said loop forming a semi-cylindrical space between the same and the outer side of said bar, and a cover plate extending over the top of said loop and hook and having a concave inner edge.

11. A bumper for an automotive vehicle formed of a substantially rigid bar having end portions at each of its ends of much greater width than thickness and disposed substantially in vertical planes respectively, each of said portions forming the end of said bumper and being reversely bent upon itself in a direction extending away from the body of said vehicle and somewhat inwardly toward the center of said bumper to form a closed terminal loop having an outer convex surface, said loop being directed away from the body of said vehicle and somewhat inwardly toward the center of said bumper, said loop thus forming a hook having a concave surface at the inner side of its bight portion.

12. The structure set forth in claim 11, and a plate overlying said loop and disposed in a substantially horizontal plane and having a concave edge extending from the end of said loop inwardly to said bar at a point spaced inwardly from the end portion of said loop.

13. A bumper structure for an automotive vehicle comprising a member extending vertically and having a recess at one side adapted to fit against a bumper, said member having upper and lower portions bent to extend substantially horizontally in a direction away from the body of said vehicle, said portions having enlarged substantially semi-spherical ends, each of said semi-spherical portions at their adjacent sides having a flat substantially vertical surface adjacent said bumper and spaced from the vertical portion of said member.

14. A bumper structure for a vehicle comprising a horizontally extending bar, a member secured to said bar and extending substantially at right angles thereto to points above and below said bar, said member having upper and lower end portions extending substantially horizontally and directed away from said bar in a direction away from the body of said vehicle, said ends having terminal portions thereon of substantially spherical form with semi-spherical surfaces directed away from said bar.

ANDREW ULMANIEC.

REFERENCES CITED

The following references are of record in the file of this patent:

UNITED STATES PATENTS

| Number | Name | Date |
|---|---|---|
| 1,362,195 | Sills | Dec. 14, 1920 |
| 1,390,285 | Gahn | Sept. 13, 1921 |
| 1,442,493 | Pearson | Jan. 16, 1923 |
| 1,582,980 | Grotenhuis | May 4, 1926 |
| 1,595,391 | Fageol | Aug. 10, 1926 |
| 1,703,700 | Yanss | Feb. 26, 1929 |
| 1,798,278 | Scott et al. | Mar. 31, 1931 |
| 1,905,590 | Isgrig | Apr. 25, 1933 |
| 1,994,918 | McMahon | Mar. 19, 1935 |
| 2,162,100 | McGregor | June 13, 1939 |
| 2,190,328 | Hans | Feb. 13, 1940 |
| 2,205,592 | Hoffmann | June 25, 1940 |
| 2,244,353 | Zaiger | June 3, 1941 |
| 2,291,370 | Brunner | July 28, 1942 |
| 2,293,689 | De Pace | Aug. 18, 1942 |